United States Patent [19]
Ribes et al.

[11] Patent Number: 6,088,810
[45] Date of Patent: Jul. 11, 2000

[54] APPARATUS FOR SYNCHRONIZED DATA INTERCHANGE BETWEEN LOCALLY DEDICATED SOURCES

[75] Inventors: Mauricio Ribes, Santiago, Chile; Günter Spahlinger, Stuttgart, Germany

[73] Assignee: Litton Systems, Inc., Woodland Hills, Calif.

[21] Appl. No.: 09/211,348

[22] Filed: Dec. 15, 1998

[51] Int. Cl.[7] .............................. H04L 7/00; G06F 1/04
[52] U.S. Cl. ........................................... 713/400; 713/500
[58] Field of Search ................................. 709/201, 202, 709/400; 713/400, 600, 500

[56] References Cited

U.S. PATENT DOCUMENTS

| | | | |
|---|---|---|---|
| 3,037,194 | 5/1962 | Dirks | 340/172.5 |
| 3,134,962 | 5/1964 | Froehlich | 340/172.5 |
| 3,373,418 | 3/1968 | Chan | 340/172.5 |
| 3,539,997 | 11/1970 | Maony | 340/172.5 |
| 3,934,079 | 1/1976 | Barnhart | 176/5.1 |
| 4,299,490 | 11/1981 | Cahill et al. | 356/350 |
| 4,313,160 | 1/1982 | Kaufman et al. | 364/260 |
| 4,799,052 | 1/1989 | Near et al. | 340/825.5 |
| 4,866,667 | 9/1989 | Shimada | 364/900 |
| 4,914,688 | 4/1990 | Kobayashi et al. | 370/93 |
| 5,301,275 | 4/1994 | Vansbuskirk et al. | 395/250 |
| 5,323,393 | 6/1994 | Barrett et al. | 370/85.8 |
| 5,657,448 | 8/1997 | Wadsworth et al. | 709/220 |
| 5,784,622 | 7/1998 | Kalwitz et al. | 710/200 |

FOREIGN PATENT DOCUMENTS

| | | | |
|---|---|---|---|
| 0389683 | 10/1990 | European Pat. Off. | G01R 31/28 |
| 04287150 | 10/1992 | Japan | G06F 13/42 |
| 05204849 | 8/1993 | Japan | G06F 13/42 |

*Primary Examiner*—Joseph E. Palys
*Assistant Examiner*—Earl T. Gunderson
*Attorney, Agent, or Firm*—Elliott N. Kramsky

[57] ABSTRACT

A synchronous serial bus with timing information implemented in the bus standard protocol is provided for a bi-directional serial multi-channel data interchange between locally dedicated measuring instruments in a distributed configuration and/or with a data processing unit. This provides synchronized interchange of data between the instruments wherein each instrument is provided with an allocated controller. The invention permits one to employ a simple, preferably standardized, bus protocol. Wiring structure is considerably simplified for a complex multi-sensor system.

8 Claims, 3 Drawing Sheets

FOUR WIRE FULL-DUPLEX CONFIGURATION

APPARATUS FOR SYNCHRONIZED DATA INTERCHANGE BETWEEN LOCALLY DEDICATED SOURCES

BACKGROUND

1. Field of the Invention

The present invention relates data interchange. More particularly, this invention pertains to a circuit for synchronized interchange of data between locally dedicated signal sources of a distributed configuration in which each signal source is provided an allocated controller.

2. Description of the Prior Art

The presence of a processor for use as a dedicated controller is common in many distributed configuration measurement systems (e.g., a plurality of sensors). This permits one to view a modern distributed configuration sensor system as a set of interactive units capable of interchanging data in a distributed processing configuration. A communication network must be provided to allow data interchange to take place to take advantage of such an arrangement. Until now, the synchronized processing of a complex communication protocol in, for example, the arrangement of a plurality of inertial sensors, such as gyros and accelerometers, has caused considerable problems. The available processing power, usually an ASIC, was devoted exclusively to solution of the main problem, i.e. control of the instruments (signal sources). Delivery of useful data is currently provided by placing it on a register that can be mapped into an external controlling computer memory. Such solution requires complex wiring to transfer the data to the main computer and an additional, independent process to synchronize the times at which measurement values are taken.

SUMMARY AND OBJECTS OF THE INVENTION

It is an object of the present invention to provide a method and apparatus that reduces hardware complexity, on the one hand, while, on the other hand, allowing interactive communication between the signal sources (or a data extracting unit) on the basis of a simple protocol.

The present invention provides an improvement in a circuit for synchronized interchange of data between different locally dedicated signal sources of a distributed configuration wherein each signal source is provided with an allocated controller. The improvement comprises a single synchronous serial bus with timing information implemented in the bus standard protocol comprising a link for bi-directional serial multi-channel data interchange between the signal source controllers and/or a data extracting unit.

The preceding and other features and advantages of this invention will become further apparent from the detailed description that follows. Such description is accompanied by a set of drawing figures in which numerals point to the features of the invention. Like numerals refer to like features throughout both the drawing figures and the written description.

BRIEF DESCRIPTION OF THE DRAWING FIGURES

Figure 5:
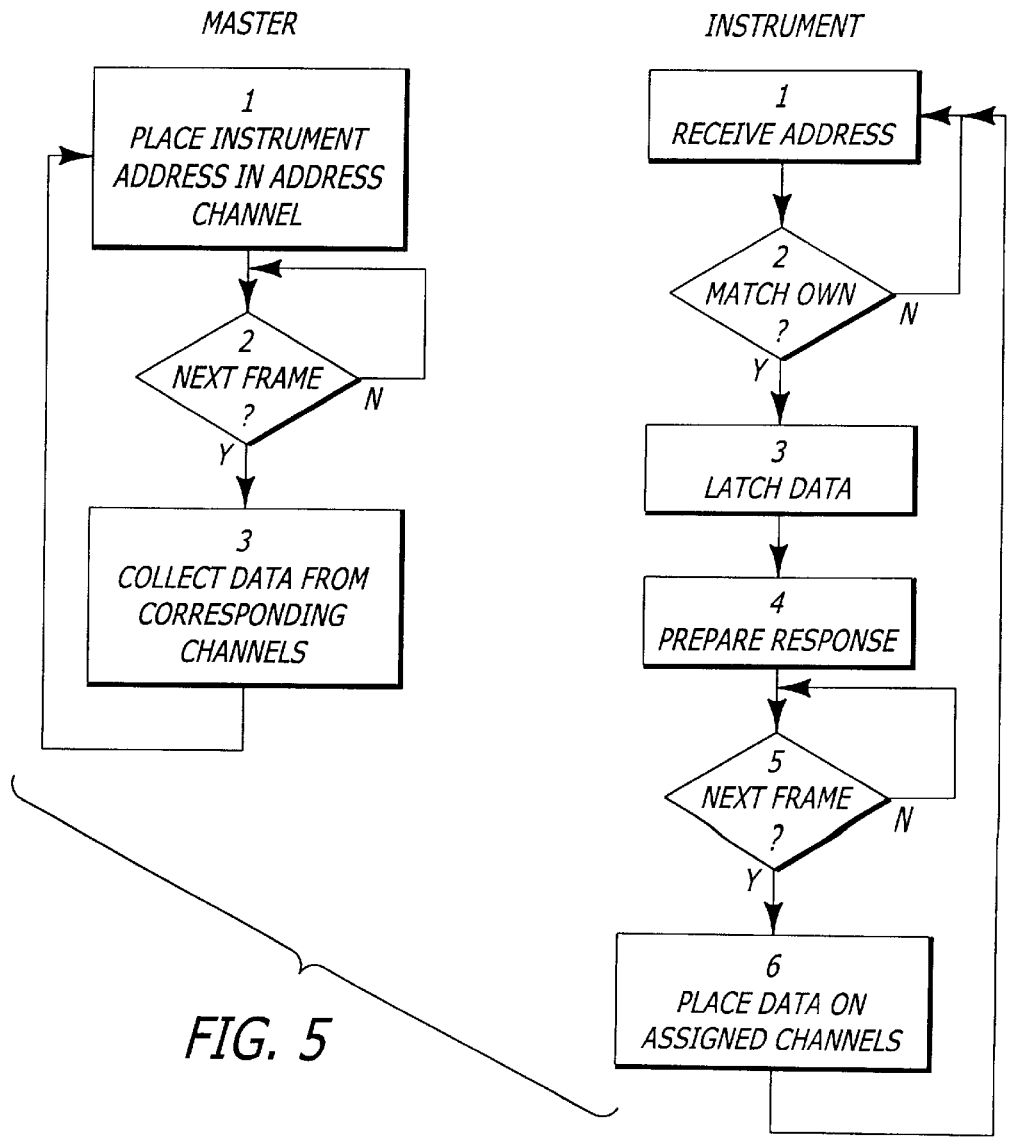
Figure 6:
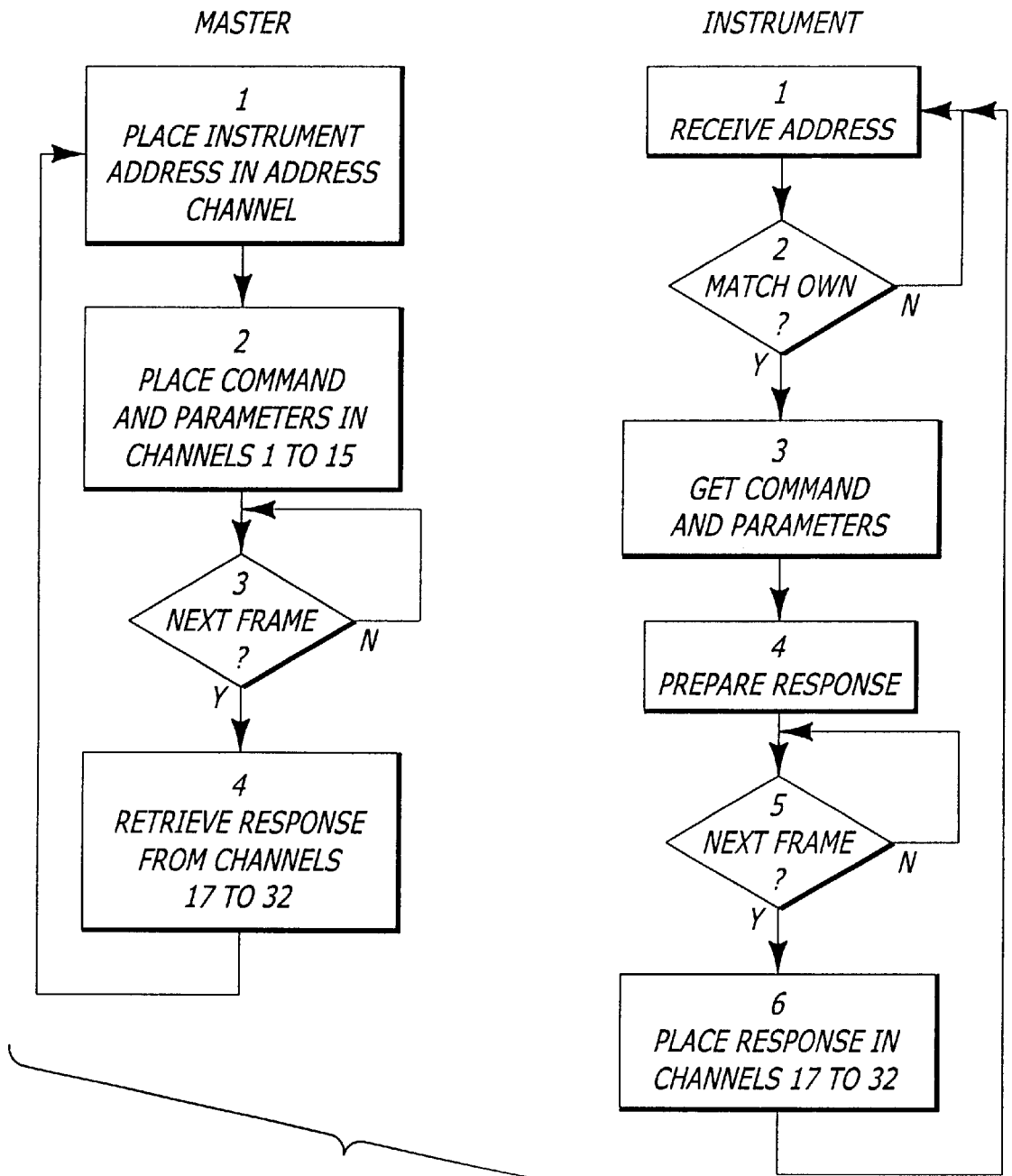

FIG. 5 comprises a pair of basic flow diagrams for an operation mode of an IBIS system according to the invention (i.e., for the master and an instrument such as a signal source, e.g., a sensor; and FIG. 6 presents a flow diagram for an IBIS calibration mode for a master and an instrument.

DETAILED DESCRIPTION OF THE PREFERRED EMBODIMENT

There typically exist two operation modes on the IBIS protocol in accordance with the invention. These are a command or calibration mode and an operational mode. When on command mode, no restrictions exist on data transfer between the signal sources (i.e., measuring units on the bus). Such mode allows access to all components of the system and is therefore ideal for integration, debugging and calibration. In command mode, each instrument (signal source) on the bus is directly and uniquely identified by its associated IBIS address.

On the other hand, the operational mode is preferably a restricted mode that allows only predefined data transfer between the signal sources (instruments, sensors) and the controlling computer. Because of such restriction, communication is simple and reliable. Provision may be made for redundancy and retransmission of data, should this be required. In operational mode, it is possible, for example, to build signal source clusters that respond to a common address. This permits simple multiple instrument synchronization.

Figure 1:
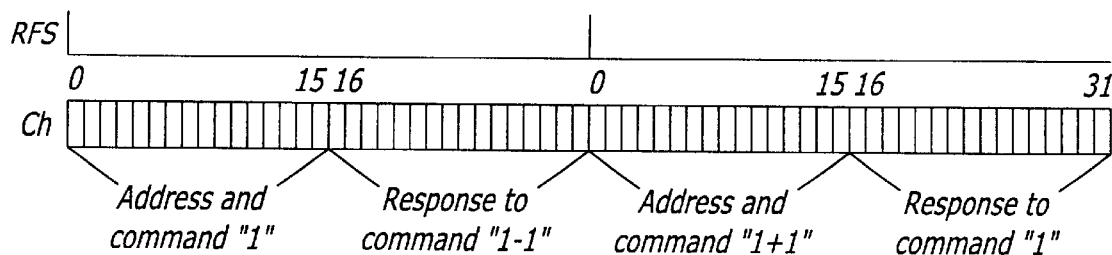
FIG. 1 depicts the frame structure of a first operation mode (i.e., a command mode) of the IBIS (Integrated Bus For Intelligent Sensors) protocol.
Figure 2:
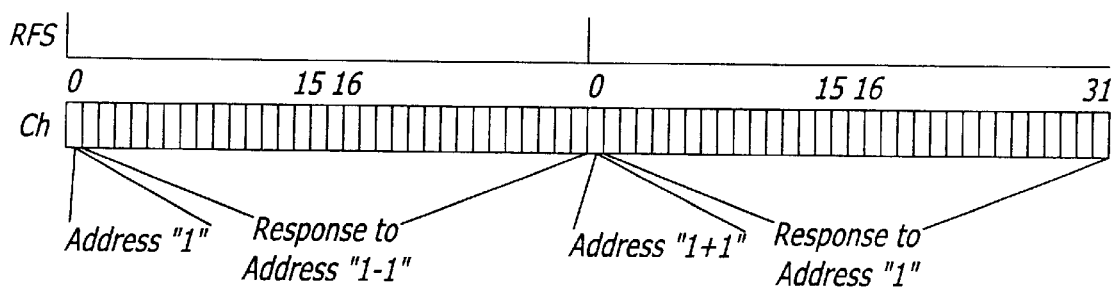
FIG. 2 illustrates the frame structure of a second operation mode (i.e., an operation mode) of an example for the IBIS protocol.

An example for configuration and timing is shown in FIGS. 1 and 2. FIG. 1 depicts the frame structure of a first operation mode (i.e., a command mode) of the IBIS protocol while FIG. 2 illustrates the frame structure of a second operation mode (i.e., an operation mode) of an example for the IBIS protocol. In the example, data transfer is in packages of 256 bits forming groups of 32 bytes. Each byte group is referred to as a frame and is marked by a framing signal.

The data distribution within one frame depends upon the operating mode of the interface (i.e., the bus). In the command mode illustrated by FIG. 1, the frame is divided into two sections. One section, for command transmission, is formed by the first 16 bytes of a frame, and the other, for the response, is formed on the second 16 bytes of a frame. The first byte of each frame is always reserved for address. As specified in FIG. 1, the response to a command is always made on the frame following the request. This permits command processing time with full transfer speed. The command format during command mode is free of format, as long as it meets the above-mentioned restrictions.

In operation mode, the frame is reserved for a signal source response with the except io n of the first byte (refer to FIG. 2). The first byte contains the IBIS address that identifies the signal source (instrument or instrument block) that should deliver its data during the next frame. The data returned by each instrument (signal source) should be th at re corded at the instrument at the time of arrival of the framing signal when its address is present on the address byte of the frame. This requirement guarantees correct data synchronization. For instrument groups, synchronization is achieved by responding to a subset of the content of the address byte.

Signal source data distribution within the frame can be freely assigned to meet system requirements, as long as the IBIS address is on the first byte of the frame.

Both modes of operation (i.e., command mode protocol and operational mode protocol) are further explained by the flow charts of FIGS. 5 and 6 in which the individual program steps are marked by respective number sequences and command legends. FIG. 5 comprises a pair of basic flow diagrams for an operation mode of an IBIS system according to the invention (i.e., for the master and an instrument, such as a signal source, e.g. a sensor) while FIG. 6 presents a flow diagram for an IBIS calibration mode for a master and an instrument.

Referring first to FIG. 5 and, in particular, to the flow diagram (operational mode), for the master it is seen that, Step 1, the master, via Dt ("Transmit Data"), addresses an instrument (server) through the channel. Frame-sync signals are issued and received via RFS ("Frame Synchronization Signal") while the serial clock is supplied via Clk. As noted with reference to FIG. 2, in the operational mode, the response data are always delivered to the data channels of the next following address. Accordingly, before the master can collect data from a corresponding channel at Step 3, the master has to check (at Step 2) the correct position of the next frame.

Referring now to the flow chart for an instrument (operational mode), such instrument (server) receives an address at Step 1 of the chart. At Step 2, it is checked to det ermine whether the received address matches that of the particular instrument. Should this prove to be the case ("yes" response at Step 2), the instrument data is latched to achieve the synchronization of a plurality of instruments. At Step 4, the instrument, an "intelligent" server, prepares a response that is based upon the latched data, then waits (at Step 5) for arrival of the next frame. If the next frame is checked correctly, the response data is assigned to the next following frame in accordance with the frame structure illustrated in FIG. 2 above.

The flow diagrams of FIG. 6 illustrate the calibration mode. Referring first to the flow chart for the master, at Step 1 the master inputs an instrument address in to the address channel (first channel byte "zero"). A respective command is placed in channel positions 1 to 15 following the address. The master then waits at Step 3, a loop, for the next frame, retrieving the response from channel bytes 17 to 32 of the respective next frame (refer to FIG. 1).

Proceeding to the flow chart of an instrument in the command or calibration mode, such instrument (server) receives an address via the address channel "zero" at Step 1. The instrument checks at Step 2 the received address for a match with its own. Should no match occur, the routine returns to Step 1. Otherwise, the command and respective parameters (in channels 1 to 15) are retrieved at Step 3 and process command. A response is then prepared at Step 4. The instrument then waits (Step 5) for the next frame and, upon confirmation of synchronization, the response of the instrument is placed in channels 17 to 32 of the next frame for transmission to the master.

Figure 3:
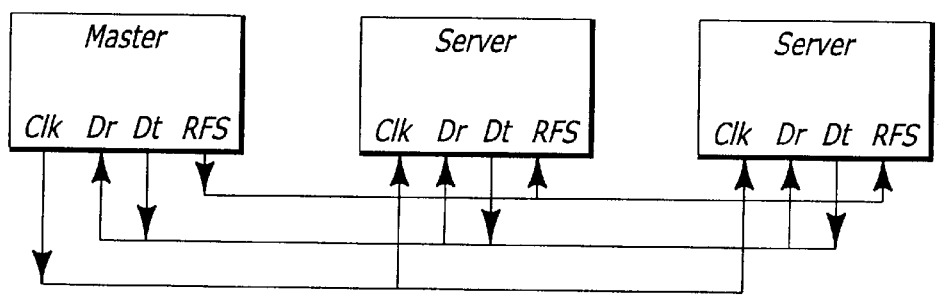
FIG. 3 illustrates a three-wire bi-directional configuration for a half duplex operation mode for an IBIS bus system embodiment of the invention.
Figure 4:
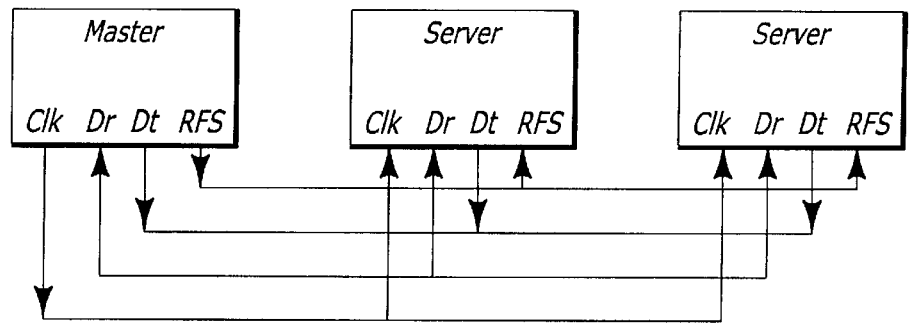
FIG. 4 illustrates a four-wire full-duplex configuration for an IBIS bus system embodiment of the invention.

Examples of an electrical configuration are given in FIGS. 3 and 4. FIG. 3 illustrates a three-wire bidirectional configuration for a half duplex operation mode. For a half-duplex operating mode, a three-wire configuration is sufficient. The configuration for a full duplex mode of an IBIS bus according to the invention is illustrated in FIG. 4.

No special definitions are made for signal levels. It is left to the user to define appropriate drivers to meet particular system requirements. A typical configuration is as follows:

Clk: Serial clock, e.g. 2048 kHz;
RFS: Frame synchronization signal at bit 256 of the frame;
Dr: Receive data;
Dt: Transmit data.

The signal Dt for the above configuration must be tri-state. Variations of are possible and may, in some cases, be necessary to meet particular sys tem requirements. With regard to the CCITT-recommendation 1431, the following modifications should be made when used with the present invention:

Only the frame concept of the operating frequency employed, not the channel assignment and the signalization);

Operation modes have no similarity to the CCITT-recommendation;

Frame synchronization and frame structure defined by an individual specification;

Frame structure has no similarity to that of the quoted CCITT-recommendation since the protocol differs for an instrument application according to the present invention; and In contrast to the CCITT-recommendation, the wiring employs basis signals but avoids mixing such signals, (i.e., the signal forming characteristics recommended by the CCITT-standard are not considered by the bus specification).

The invention is based on t he idea of implementing or integrating the time sequential control of the signal sources (instruments) and the data flow bi-directionally into a single internal synchronous serial bus between the signal sources and with a data extracting unit, an external computer, for example. Such system, for purposes of abbreviation, is called IBIS. The IBIS bus system provides a means that allows bi-directional communication between the processors of the locally-dedicated signal sources, (e.g., measuring units such as inertial sensors). It employs a simple protocol that is supported by low-cost processors. As a serial bus is employed, the required number of interconnections is drastically reduced. Additionally, by making use of the implemented synchronous characteristics of the bus it is possible to integrate timing information into the serial bus protocol, enabling transfer of the required timing information to the signal sources without any additional requirements. These characteristics of the IBIS system make it very convenient for multi-sensor systems. The use of such a bus for instrument communication and synchronization offers considerable manufacturing advantages by simplifying the assembly of a complex multi-sensor system.

The inventive concept is useful for many applications where local digital processors are used in connection with specific sensors. The typical IBIS configuration is a synchronous serial communication system that provides interchange of data while maintaining a very tight timing relationship between the various components. Such system is specifically suited to extract data that must be referred to a particular instant in time with a minimum overhead in the hardware structure. As it is a serial bus system, the required wiring can be kept to a minimum.

In order to further facilitate easy implementation in almost all of today's advanced microprocessors and digital signal processor systems, it is recommended that standardized protocol recommendations, for example those of the basic standard CCITT 1431, be followed as closely as possible. This makes the IBIS bus system simple, low-cost and provides f or an effective alternative for accurate communication between distributed signal sources and/or external communication.

While this invention has been described with reference to its presently-preferred embodiment, it is not limited thereto. Rather, the invention is limited only insofar as it is defined by the following set of patent claims and includes within its scope all equivalents thereof.

What is claimed is:

1. In a circuit for synchronized interchange of data between different locally dedicated signal sources of a distributed configuration wherein each signal source is provided with an allocated controller, the improvement comprising:
   a) a single synchronous serial bus with timing information implemented in the bus standard protocol comprising a link for bi-directional serial multi-channel data interchange between said signal source controllers and/or a data extracting unit;
   b) said single synchronously operated serial bus is operated for synchronized data exchange between a plurality of intelligent sensors or servers and one master controller in an operational mode and in a command mode;
   c) said master controller is controlled in said operational mode so that data exchange between said master controller and at least one of said sensors is initiated and completed over two time frames; and
   d) each of said frames is formed of groups of a same plurality of bytes so that a specific instrument address placed in a specific byte position by said master controller is followed by a defined number of byte positions reserved for sensor response information from an instrument addressed during the previous frame.

2. A circuit as defined in claim 1, wherein said signal sources are measuring instruments, in particular inertial sensors.

3. In a circuit for synchronized interchange of data between different locally dedicated signal sources of a distributed configuration wherein each signal source is provided with an allocated controller, the improvement comprising:
   a) a single synchronous serial bus with timing information implemented in the bus standard protocol comprising a link for bi-directional serial multi-channel data interchange between said signal source controllers and/or a data extracting unit;
   b) said single synchronously operated serial bus is operated for synchronized data exchange between a plurality of intelligent sensors or servers and one master controller in an operational mode and in a command mode;
   c) said master controller is controlled in said command mode so that an address and a command for at least one of said sensors are placed in a first time frame comprising a defined plurality of bytes; and
   d) said sensor response to said command is transmitted during the next following frame in predetermined byte positions within each frame.

4. In a circuit for synchronized interchange of data between different locally dedicated signal sources of a distributed configuration wherein each signal source is provided with an allocated controller, the improvement comprising:
   a) a single synchronous serial bus with timing information implemented in the bus standard protocol comprising a link for bi-directional serial multi-channel data interchange between said signal source controllers and/or a data extracting unit;
   b) means for operating said bus for synchronized data exchange between a plurality of intelligent sensors or servers and one master controller in an operational mode and in a command mode;
   c) means for controlling said master controller in said operational mode so that data exchange between said master controller and at least one of said sensors is initiated and completed over two time frames; and
   d) each of said frames is formed of groups of a same plurality of bytes so that a specific instrument address placed in a specific byte position by said master controller is followed by a defined number of byte positions reserved for sensor response information from an instrument addressed during the previous frame.

5. In a circuit for synchronized interchange of data between different locally dedicated signal sources of a distributed configuration wherein each signal source is provided with an allocated controller, the improvement comprising:
   a) a single synchronous serial bus with timing information implemented in the bus standard protocol comprising a link for bi-directional serial multi-channel data interchange between said signal source controllers and/or a data extracting unit;
   b) means for operating said bus for synchronized data exchange between a plurality of intelligent sensors or servers and one master controller in an operational mode and in a command mode;
   c) means for controlling said master controller in said command mode so that an address and a command for at least one of said sensors are placed in a first time frame comprising a defined plurality of bytes; and
   d) means for transmitting said sensor response to said command during the next following frame in predetermined byte positions within each frame.

6. A circuit as defined in claim 3 wherein said signal sources are measuring instruments, in particular inertial sensors.

7. A circuit as defined in claim 4 wherein said signal sources are measuring instruments, in particular inertial sensors.

8. A circuit as defined in claim 5 wherein said signal sources are measuring instruments, in particular inertial sensors.

* * * * *

UNITED STATES PATENT AND TRADEMARK OFFICE
CERTIFICATE OF CORRECTION

PATENT NO. : 6,088,810
DATED : July 11, 2000
INVENTOR(S) : Mauricio Ribes and Gunter Spahlinger It is certified that error appears in the above-identified patent and that said Letters Patent is hereby corrected as shown below:

Change Assignee from "Litton Systems, Inc., Woodland Hills, Calif." to --LITEF GmbH, Germany--.

Signed and Sealed this

Twenty-second Day of May, 2001

Attest:

NICHOLAS P. GODICI

Attesting Officer     Acting Director of the United States Patent and Trademark Office

UNITED STATES PATENT AND TRADEMARK OFFICE
CERTIFICATE OF CORRECTION

PATENT NO. : 6,088,810
DATED : July 11, 2000
INVENTOR(S) : Mauricio Ribes and Gunter Spahlinger It is certified that error appears in the above-identified patent and that said Letters Patent is hereby corrected as shown below:

Add
   -- Foreign Application Priority Data

December 16, 1997 (EP) European Pat. Off. ...97122204.7-2209

Signed and Sealed this

Twentieth Day of November, 2001

Attest:

NICHOLAS P. GODICI
*Attesting Officer*    *Acting Director of the United States Patent and Trademark Office*